March 12, 1963  T. B. DALTON  3,081,065
LANDING GEAR FOR SEMI-TRAILERS AND THE LIKE
Filed Oct. 16, 1958  3 Sheets-Sheet 1

INVENTOR.
THOMAS B. DALTON
BY
ATTORNEYS

March 12, 1963 T. B. DALTON 3,081,065
LANDING GEAR FOR SEMI-TRAILERS AND THE LIKE
Filed Oct. 16, 1958 3 Sheets-Sheet 2
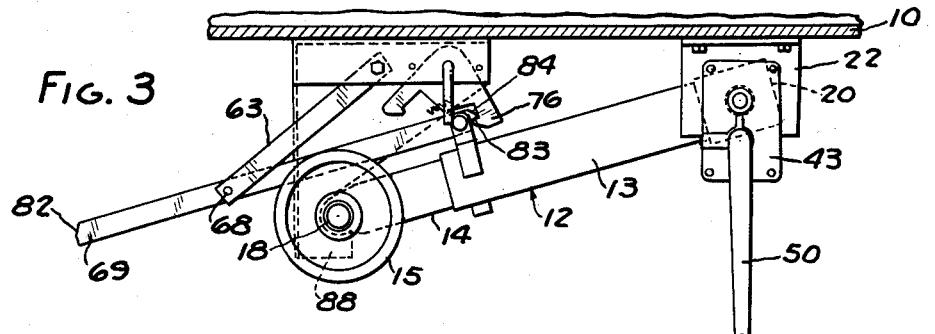
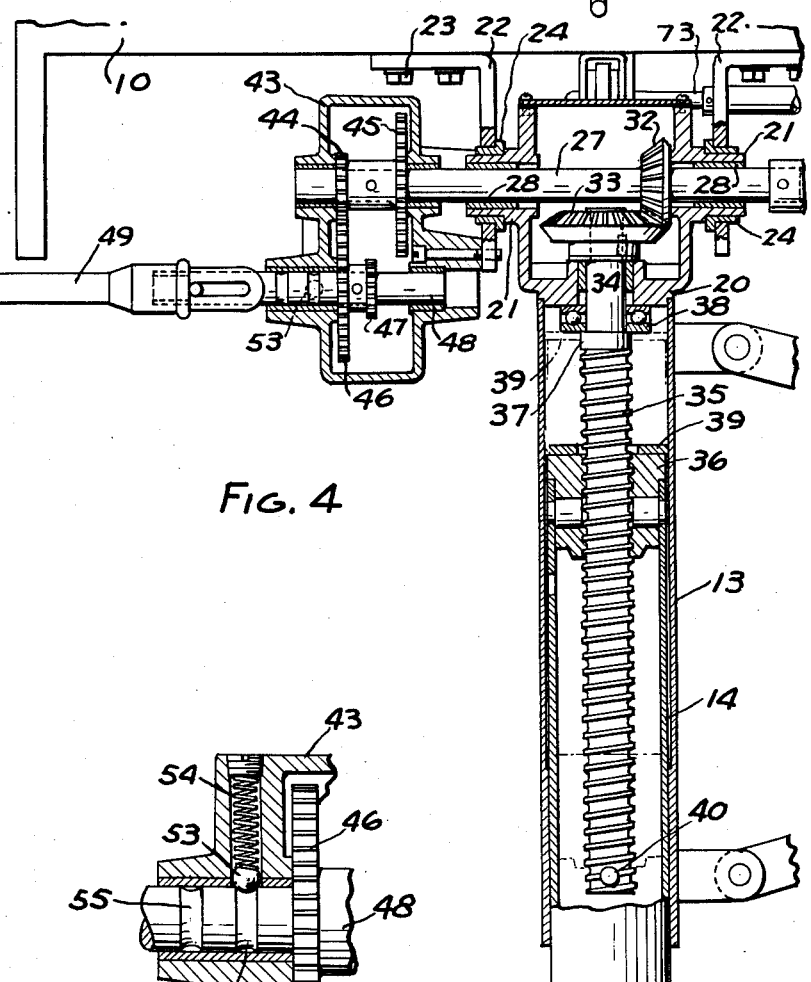
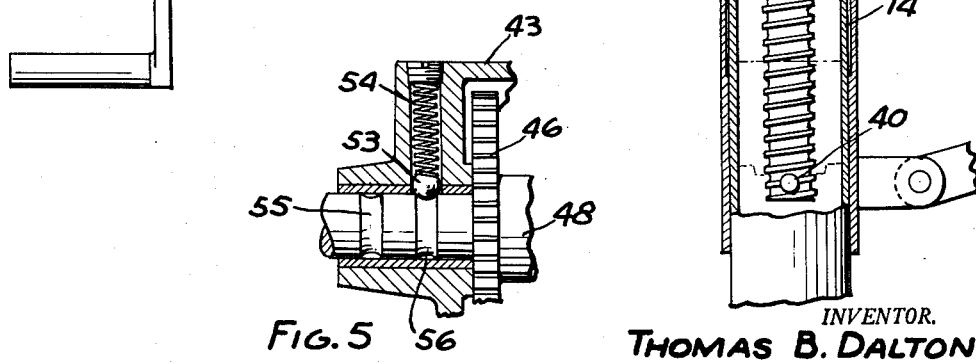
INVENTOR.
THOMAS B. DALTON
ATTORNEYS March 12, 1963 T. B. DALTON 3,081,065
LANDING GEAR FOR SEMI-TRAILERS AND THE LIKE
Filed Oct. 16, 1958 3 Sheets-Sheet 3

INVENTOR.
THOMAS B. DALTON
BY
ATTORNEYS

United States Patent Office 3,081,065
Patented Mar. 12, 1963

3,081,065
LANDING GEAR FOR SEMI-TRAILERS AND THE LIKE

Thomas B. Dalton, Muskegon, Mich., assignor to West Michigan Steel Foundry Co., Muskegon, Mich., a corporation of Michigan
Filed Oct. 16, 1958, Ser. No. 767,741
9 Claims. (Cl. 254—86)

The semi-trailers with which this invention is involved usually have rearward ends supported by wheeled running gear, their forward ends being supported by a fifth wheel on a tractor during road use. The landing gear is provided for supporting the forward end when the fifth wheel is disconnected and the support of the tractor is removed. The landing gear is usually retractable upwardly to facilitate road use of the semi-trailer.

An object of the present invention is to provide a relatively simple inexpensive landing gear of the retractable type having improved compact construction and rapid convenient operation.

The invention generally contemplates landing gear wherein the supporting legs are pivotally mounted for swinging on the trailer frame between a downward position and a retracted position, the legs also being shortenable and extensible by a jack screw mechanism. The perating shaft for the jack screw is journaled coaxially with the mounting pivots for the legs so that when the legs are shortened to their fullest extent continued turning of the operating shaft swings the legs upwardly. A latch is provided for temporarily holding the legs in their upward position while the legs are extended into engagement with a bracket which supports the legs during road use. The latch is releasable after the legs have been retracted from the supporting brackets so that the legs may be swung downward and extended to their trailer supporting position. The numerous advantages of this arrangement appear in the detailed description. One form of the invention is shown in the accompanying drawings.

FIG. 3 is a view similar to FIG. 2 but illustrating the landing gear in its retracted position.

FIG. 4 is an enlarged generally sectional view illustrating operating mechanism for the landing gear.

FIG. 5 is an enlarged sectional view taken on line 5—5 of FIG. 2.

Figure 1:
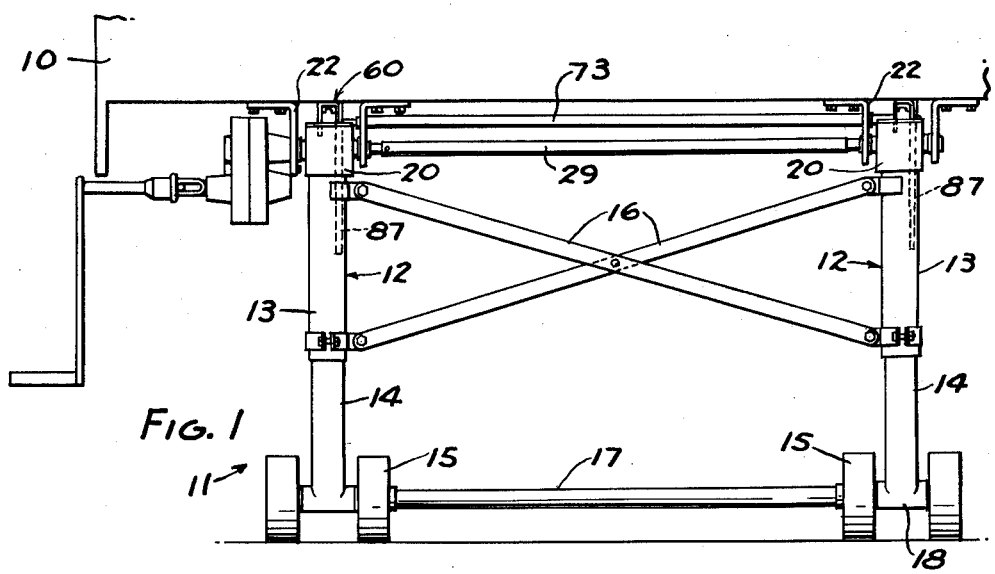
FIG. 1 is a generally front elevational view illustrating a landing gear utilizing the present invention.

Illustrated in the drawings is a portion of a trailer frame 10 to which landing gear 11 in accordance with this invention is secured. The landing gear includes a pair of legs 12 which are preferably identical except for having right and left hand relation, each having a tubular upper section 13 within which is slidably telescoped a lower section 14 which carries ground engaging wheels 15. Upper leg sections 13 are provided with cross braces 16 as illustrated and an axle 17 extending between the sets of wheels 15 is supported by bearing portions 18 at the lower ends of the legs.

Fixed to the upper end of each leg 13 is a housing 20 having a pair of oppositely outwardly projecting hollow journal members 21. A dependent bracket 22 is pivotally secured to the exterior of each journal member (FIG. 4) and anchored to trailer frame 10 by bolts 23, and a bushing 24 may be interposed between each bracket and journal member. This provides a pivotal mount for legs 12 so that they can be swung between the downward position illustrated in FIGS. 1 and 2 and upward position illustrated in FIG. 3. A shaft 27 is journaled within journal members 21 and this shaft rotates coaxially with the axis of the pivot between brackets 22 and journal members 21. Bushings 28 may be provided between shaft 27 and the journal members. The shafts in the two housings 20 at opposite sides of the trailer are interconnected by a shaft 29.

A bevel gear 32 is keyed to shaft 27 and engages another bevel gear 33 keyed to a vertical shaft 34 journaled in housing 20 and having a lower portion which forms a jack screw 35 engaged with a nut 36 anchored to lower leg portion 14. When bevel gear 32 is turned by shaft 27 the jack screw mechanism will be operated to raise and lower leg section 14. Shaft 34 has an enlargement 37 in load bearing abutment against a thrust bearing 38 and nut 36 has a top member 39 engageable against the thrust bearing when leg portion 14 is elevated. A pin 40 is provided through jack screw 35 to limit downward movement of leg section 14.

Figure 2:
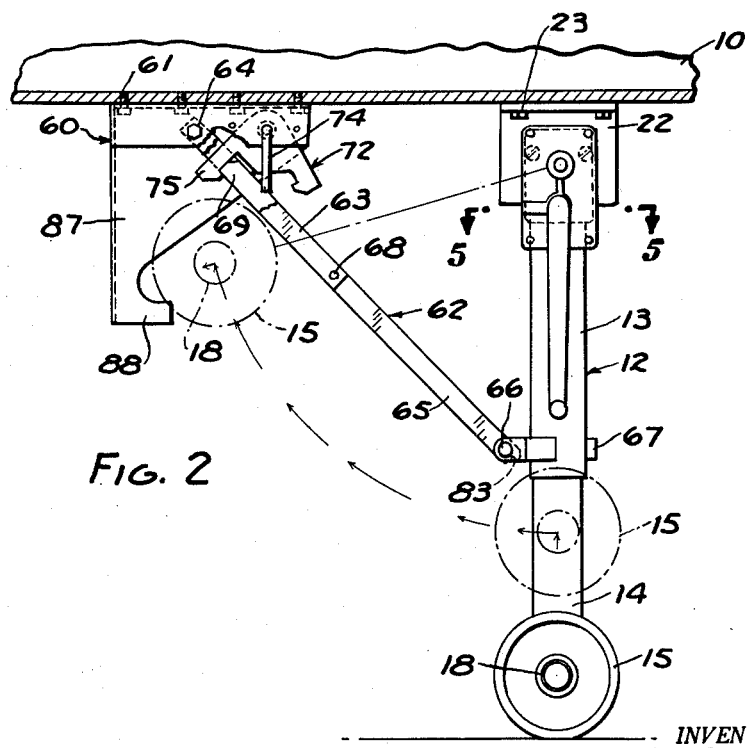
FIG. 2 is a generally side elevation view of the landing gear.

Shaft 27 extends beyond journal portions 21 into a gear box 43 where it is keyed to a small gear 44 and a larger gear 45. A large gear 46 and a small gear 47 are keyed to a shaft 48 journaled in gear box 43 and operatively engaged by a shaft portion 49 of a crank or operating handle 50. Shaft 48 is axially shiftable to interengage gears 46 and 44 as illustrated in FIG. 2 or selectively to interengage gears 47 and 45 for changing gear ratio. A detent ball 53 is urged by spring 54 into one of grooves 55 and 56 in shaft 48 to releasably secure it in its selected position.

A bracket 60 is secured to each side of the trailer frame 10 to the rear of brackets 22 by bolts 61. A pair of struts 62 is provided for supporting legs 12 in their downward position and the strut for each leg includes an upper member 63 pivoted to bracket 60 as at 64 and a lower strut member 65 pivoted as at 66 to a collar 67 on upper leg section 13. The strut members are pivotally interconnected at 68. The upper strut member has two spaced apart portions 63a and 63b and the lower strut member has an extension 69 which projects upwardly beyond pivot 68 and between these portions.

A latch or keeper plate 72 is rockably secured to each bracket 60 and for this purpose each latch is fixed on a shaft 73 pivoted on and extending between the brackets. The shaft is provided at at least one side of the vehicle with a laterally extending operating handle 74. Each latch plate has a pair of oppositely opening hook portions 75 and 76 each with an external beveled portion 77—78 forming a cam surface for a purpose to be described. Latch plate 72 has a recess 79 containing a coil spring 80 whose end portion 81 projects out of the recess for engagement against strut extension 69. The strut extension has at its upper end a beveled surface 82 and strut 65 is provided adjacent its lower end with a hook conformation 83 and an exterior beveled portion 84 also for a purpose to be described. Brackets 60 carry pins 85 and 86 to limit rocking movement of keeper 72.

Each bracket 60 includes a downwardly depending portion 87 defining a hook 88 arranged to receive a portion of the lower end of leg section 14 such as bearing portion 18.

Figure 6:
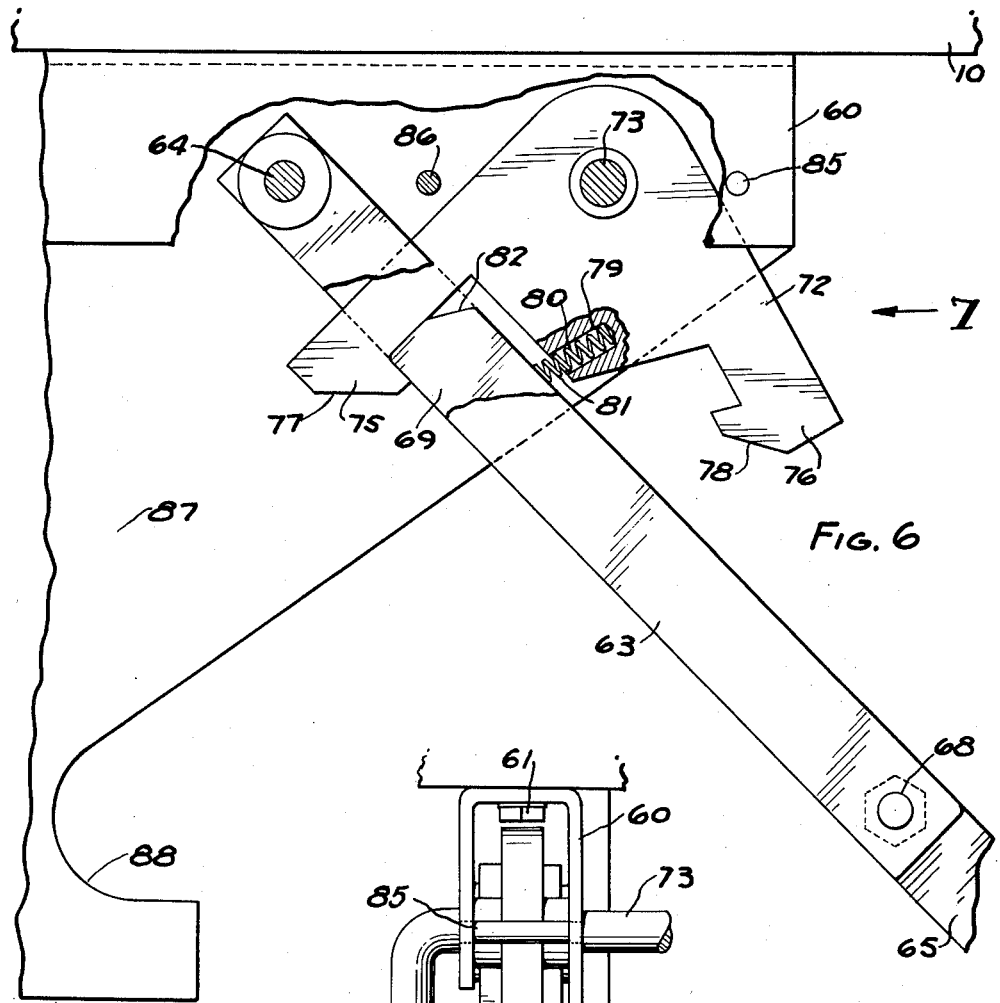
FIG. 6 is an enlarged fragmentary side elevation of a latch securing the landing gear strut members in extended relation.
Figure 7:
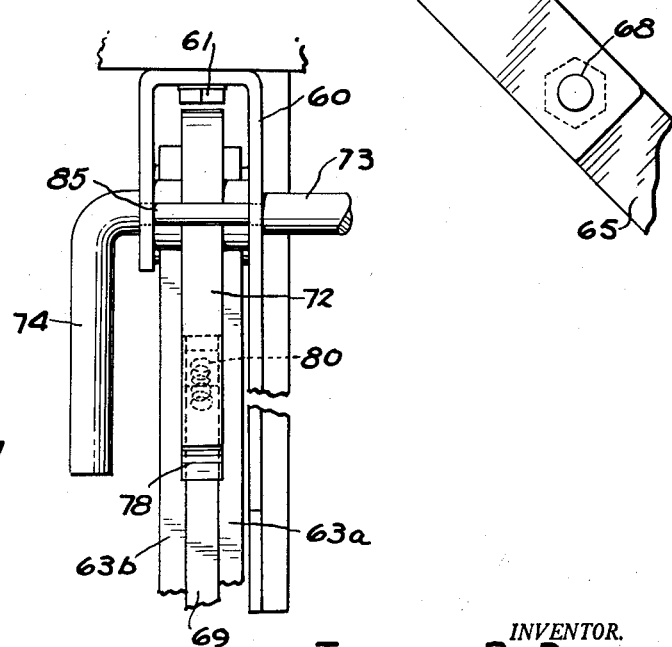
FIG. 7 is an end view of the latch mechanism taken generally in the direction of arrow 7 of FIG. 6.

In use it may be assumed that initially the landing gear is in its downward and extended condition illustrated in FIGS. 1 and 2 in solid lines with ground engaging wheels 15 resting on the ground to support trailer frame 10. Strut members 63 and 65 are in mutual extension. Extension 69 of strut member 65 is engaged by hook 75 on latch 72 and this prevents the upper end of the strut extension from swinging about either pivot 66 or 68 thereby locking the strut members against relative movement so that strut 62 formed thereby braces legs 12 against rearward swinging movement. Spring 80 is compressed against strut extension 69, urging latch 72 toward rotation counter-clockwise as FIGS. 2 and 6 are viewed and restraining unintentional disengagement of hook 75 from extension 69.

To prepare the semi-trailer for road use, a tractor is backed under the forward end of the trailer in a conventional manner and coupled to the semi-trailer. This usually elevates frame 10 and the landing gear so that wheels 15 are raised off the ground. To retract the landing gear for road use, handle 50 and shaft 49 are forced inwardly until gears 47 and 45 engage to provide a high gear ratio to make retracting of the landing gear easy. Handle 50 is then cranked and this, through the gearing in gear box 43, shaft 27, and gearing 32—33 operates jack screw 35 in nut 36 to raise the lower landing gear leg sections 14 and wheels 15 vertically upwardly. When the top plate 39 on nut 36 engages the base of thrust bearing 38 vertical elevating movement of leg sections 14 is halted. Wheels 15 are now in the lower dotted line position of FIG. 2.

Handle 74 is now turned in a clockwise direction as FIG. 2 is viewed to rock plate 72 against the action of spring 80 so that hook 75 disengages the upper end of strut extension 69. When hook 75 clears the strut extension spring 80 shifts the strut extension sufficiently to prevent re-engagement of the hook and extension. The operator now resumes turning crank 50 in a clockwise direction. Since beveled gears 32 and 33 can no longer turn relative to each other, they co-operate upon continued turning of shaft 27 to swing legs 12 about their pivotal mounts provided by engagement of journal portions 21 of housings 20 in brackets 22.

As the legs swing upwardly and rearwardly strut members 63 and 65 swing on pivots 64—66—68 and fold relatively to each other with strut member 65 swinging to a position generally parallel to leg 12. This swings bevel 84 on the lower end of strut 65 to a position for engaging bevel 78 on latch plate 72 adjacent the upper end of the path of swinging movement of leg 12. Bevels 84 and 78 rock plate 72 enabling hook 83 on the strut member and hook 76 on the latch plate to be interengaged as illustrated in FIG. 3 when the leg is swung completely upwardly. Leg 12 is thereby supported temporarily in its upward position when the supporting torque on shaft 27 is relieved. Wheels 15 are now in the upper dotted line position of FIG. 2.

Depending hook 88 is displaced to one side of the path of swinging movement of leg 12 in its shortened condition so that the leg can be swung upwardly without interference for interengaging hooks 76 and 83. While the leg is supported by these elements, operating handle 50 is turned in a counterclockwise direction as the drawings are viewed to operate jack screw 35 for extending leg section 14 to bring portions 18 of the legs into engagement with hooks 88. Hooks 88 provide the permanent support for the landing gear in retracted position and the trailer is now ready for road use.

To lower the landing gear, operating handle 50 is turned in a clockwise direction for retracting leg sections 14 so that portions 18 thereof disengage hooks 88 and the legs are shortened to the upward dotted line condition illustrated in FIG. 2. Handle 74 is then turned counter-clockwise to disengage hooks 84 and 76. This permits the legs 12 to swing gravitationally to their downward position and during this movement strut members 63 and 65 swing into mutually extended relation.

Also during this movement bevels 77 and 82 on latch plate 72 and strut extension 69 respectively interengage to rock latch plate 72 clockwise to facilitate entry of the upper end of the strut extension 69 into hook 75. The strut extension compresses spring 80 which returns the latch plate counter-clockwise to again establish the locked relation of hook 75 around the strut extension. Legs 12 are now braced forwardly. Operating handle 50 is now turned counter-clockwise to operate jack screw 35 for lowering leg sections 15 and ground engaging wheels 15. When the support of the tractor is removed from trailer bed 10, wheels 15 engage the ground and the landing gear supports the trailer bed.

The gearing in gear box 43 may be disengaged by axially shifting shaft 48 to facilitate downward swinging of the landing gear without spinning handle 50. Shaft 48 may also be shifted to the left as the FIG. 3 is viewed to engage gears 44 and 46 to facilitate rapidly extending leg sections 14 downwardly.

The invention thus provides a landing gear which can be swung to a retracted position well above the road and which, because of its shortenable nature, provides a relatively compact arrangement. The coaxial leg pivots and operating shaft provide for rapid, convenient simple retraction of the landing gear through both its shortening and swinging movements by turning the operating handle continuously in the same direction.

I claim:

1. In a semi-trailer or the like having a frame to which landing gear may be secured, landing gear structure comprising, an extensible leg having ground engaging means, mounting means adapted to be secured to the trailer frame and mounting said leg for swinging between a downward position and a retracted position, a strut having two members pivoted together, one member having a pivotal connection to said leg and the other member being adapted to be pivotally secured to the trailer frame, said strut supporting said leg against swinging movement when said members are in mutually extended relation, said one member having an extension beyond the pivot between said members, a keeper adapted to be mounted on the trailer frame and engaging said extension to restrain swinging movement thereof whereby to retain said strut members in mutually extended relation, operating means operable to extend and shorten said leg while said strut members are in mutually extended relation, said keeper being releasable to facilitate swinging movement of said leg, said operating means including means operable when said keeper is released to swing said leg in shortened condition to said retracted position, said leg and keeper carrying elements which are interengageable in said retracted position of said leg to provide a first support securing said leg in said retracted position, a second support adapted to be secured to the trailer frame at a location displaced from the path of swinging movement of said leg in shortened condition, said operating means being operable to extend said leg into supported relation with said second support while said elements are interengaged, said elements being disengageable upon shortening of said leg away from said second support to facilitate swinging said leg to said downward position.

2. In a semi-trailer or the like having a frame to which landing gear may be secured, landing gear structure comprising, an extensible leg having ground engaging means, mounting means adapted to be secured to the trailer frame and mounting said leg for swinging between a downward position and a retracted position, a strut having two members pivoted together, one member having a pivotal connection to said leg and the other member being adapted to be pivotally secured to the trailer frame, said strut supporting said leg against swinging movement when said members are in mutually extended relation, said one member having an extension beyond the pivot between said members, a latch adapted to be rockably mounted on the trailer frame, said latch being spring biased into engagement with said extension to restrain swinging movement thereof whereby to retain said strut members in mutually extended relation, said latch being rockable to disengage said extension, operating means for extending and shortening said leg, said operating means including means operable when said latch is released to swing said leg in shortened condition to said retracted position, said strut members folding relative to each other upon swinging of said leg, said latch and leg carrying elements interengageable to provide a first support supporting said leg in said retracted position, a second support adapted to be secured on said trailer frame at a location displaced from the path of swinging movement of said leg in shortened condition, said operating means being operable while said elements are interengaged to extend said leg into supported relation with said second support and to shorten said leg for retracting the same out of supported relation thereby, said elements being releasable upon shortening of said leg out of supported relation by said second support to facilitate swinging said leg to said downward position, said latch and extension having portions interengageable to rock said latch to an extension-receiving position responsively to return movement of said members to mutually extended condition, the biasing spring being operative upon said return movement to close said latch for locking said strut members into leg supporting relation.

3. The combination defined in claim 2 wherein the biasing spring is stressed between said latch and said extension.

4. The combination defined in claim 2 wherein said latch has two hook portions opening in opposite directions, one hook portion interengaging said extension when said strut members are mutually extended, and the other hook portion provides one of the interengageable elements forming said first support.

5. The combination defined in claim 4 wherein the other of the elements providing said first support comprises a portion of said one member adjacent the end thereof opposite from said extension.

6. In a semi-trailer or the like having a frame to which landing gear may be secured, landing gear structure comprising, an extensible leg having ground engaging means, mounting means adapted to be secured to the trailer frame and mounting said leg for swinging between a downward position and a retracted position, means forming a bracket adapted to be secured to the trailer frame, a strut having two members pivoted together one member being pivoted to said leg and the other member being pivoted to said bracket, said strut supporting said leg against swinging movement when said members are in mutually extended relation, said one member having an extension beyond the pivot between said members, a keeper mounted on said bracket and engaging said extension to restrain swinging movement thereof whereby to retain said strut members in mutually extended relation, said keeper being releasable to facilitate swinging movement of said strut members and leg, operating means for extending and shortening said leg, said operating means including means operable to swing said leg in shortened condition to said retracted position, said keeper and leg carrying elements which interengage to provide a first support for said leg in said retracted position, means supported by said bracket forming a second support displaced from the path of swinging movement of said leg in shortened condition, said operating means being operable while said leg is supported by said first support to extend said leg into supported relation with said second support and to shorten said leg for retracting it away from supported relation by said second support, said elements being releasable when said leg is retracted from said second support to facilitate swinging said leg to said downward position.

7. The combination defined in claim 6 wherein said bracket has a depending portion with a recess therein forming said second support, said leg having means entering said recess in supported relation when said leg is extended in said retracted position.

8. Landing gear structure for a semi-trailer or the like comprising, a leg which is extensible and shortenable by mechanism including gearing, means forming a pivotal mount for said leg adapted to be secured to a trailer or the like so that said leg swings between a downward position and a retracted position, said gearing including two interengaged gears, one of which is mounted for rotation on an axis which is in substantially fixed coaxial relation with the axis of said pivotal mount and the other of which is mounted on said leg for rotation on an axis transverse to the fixed axis, said leg being shortenable responsive to rotation of said one gear in one direction, limit means operative in shortened condition of said leg to restrain relative rotation of said gears, said one gear being operative upon continued turning thereof in said one direction to swing said other gear bodily about said fixed axis, whereby to swing said leg on said pivotal mount to said retracted position, and means providing two supports adapted to be mounted on a trailer, the first support being operable to support said leg in shortened condition in said retracted position thereof, the second support being displaced from the path of swinging movement of said leg in shortened condition, said leg being extensible into supported relation with said second support responsive to rotation of said one gear in the other direction while said leg is supported by said first support, said leg being shortenable away from said second support responsive to rotation of said one gear in said one direction, said first support being releasable to facilitate swinging said leg to said downward position.

9. Landing gear structure for a semi-trailer or the like comprising, a leg which is extensible and shortenable by mechanism including gearing, means forming a pivotal mount for said leg adapted to be secured to a trailer or the like so that said leg swings between a downward position and a retracted position, said gearing including two interengaged gears, one of which is mounted for rotation on an axis which is in substantially fixed coaxial relation with the axis of said pivotal mount and the other of which is mounted on said leg for rotation on an axis transverse to the fixed axis, said leg being shortenable responsive to rotation of said one gear in one direction, limit means operative in shortened condition of said leg to restrain relative rotation of said gears, said one gear being operative upon continued turning thereof in said one direction to swing said other gear bodily about said fixed axis, whereby to swing said leg on said pivotal mount to said retracted position, and means providing two supports adapted to be secured on a trailer, one of which is releasably engageable with said leg responsive to swinging thereof to said retracted position and the other of which is engaged and released by extension and shortening of said leg in said retracted position thereof.

References Cited in the file of this patent

UNITED STATES PATENTS

| 1,524,083 | Clement | Jan. 27, 1925 |
| 1,988,304 | Duman | Jan. 15, 1935 |
| 2,232,187 | Reid | Feb. 18, 1941 |
| 2,977,094 | McKay | Mar. 28, 1961 |

FOREIGN PATENTS

| 1,082,494 | France | June 16, 1954 |
| 796,938 | Great Britain | June 25, 1958 |